United States Patent
Hayman et al.

(10) Patent No.: US 9,109,507 B2
(45) Date of Patent: Aug. 18, 2015

(54) ENGINE ASSEMBLY WITH VARIABLE VALVE DISPLACEMENT ON ONE CYLINDER BANK AND METHOD OF CONTROLLING SAME

(71) Applicant: GM GLOBAL TECHNOLOGY OPERATIONS LLC, Detroit, MI (US)

(72) Inventors: Alan W. Hayman, Romeo, MI (US); Robert S McAlpine, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 390 days.

(21) Appl. No.: 13/654,896

(22) Filed: Oct. 18, 2012

(65) Prior Publication Data

US 2014/0109847 A1 Apr. 24, 2014

(51) Int. Cl.
*F02D 13/06* (2006.01)
*F02B 75/22* (2006.01)
*F02D 13/02* (2006.01)

(52) U.S. Cl.
CPC ............. *F02B 75/22* (2013.01); *F02D 13/02* (2013.01); *F02D 13/06* (2013.01); *Y02T 10/18* (2013.01)

(58) Field of Classification Search
CPC ......... F02B 75/22; F02D 17/02; F02D 13/06; F02D 41/0087; F01L 13/0005; F01L 2013/001
USPC .................... 123/399, 90.15, 198 F, 345–348
See application file for complete search history.

(56) References Cited

U.S. PATENT DOCUMENTS

| | | | |
|---|---|---|---|
| 6,332,445 B1 * | 12/2001 | Voss et al. .................. | 123/198 F |
| 6,874,463 B1 * | 4/2005 | Bolander et al. ........... | 123/198 F |
| 7,383,119 B2 * | 6/2008 | Lewis ........................... | 701/112 |
| 2006/0005811 A1 * | 1/2006 | Hartmann ................ | 123/406.47 |
| 2006/0037578 A1 * | 2/2006 | Nakamura ................. | 123/198 F |
| 2007/0186884 A1 * | 8/2007 | Grider ........................ | 123/90.15 |

FOREIGN PATENT DOCUMENTS

GB 2 387 620 A * 10/2003 ............. F02D 13/06

* cited by examiner

*Primary Examiner* — Hai Huynh
(74) *Attorney, Agent, or Firm* — Quinn Law Group, PLLC

(57) ABSTRACT

An engine assembly includes an engine block having a first bank of cylinders and a second bank of cylinders. A crankshaft is supported by the engine block and is configured to be driven by torque due to combustion energy in the first and second banks of cylinders. A first set of valves is operable to control air flow into and out of the first bank of cylinders. Camshafts driven by the crankshaft are operatively connected to the first set of valves to control opening and closing of the first set of valves. A second set of valves is operable to control air flow into and out of the second bank of cylinders. A controller is operatively connected to the second set of valves and is configured to vary at least one of lift, duration, and timing of the second set of valves based on commanded torque at the crankshaft.

16 Claims, 4 Drawing Sheets

ENGINE ASSEMBLY WITH VARIABLE VALVE DISPLACEMENT ON ONE CYLINDER BANK AND METHOD OF CONTROLLING SAME

TECHNICAL FIELD

The present teachings generally include an engine assembly with two banks of cylinders and a method of controlling valves to control air flow into and out of the cylinders.

BACKGROUND

Fuel efficient vehicles are desirable for cost savings and environmental benefits. Smaller engines tend to be more fuel efficient, but may be more limited in torque and power output. Performance flexibility can be realized by equipping an engine with continuously variable cylinder valves. Alternatively, a relatively large engine with a relatively high maximum torque can be used, with some cylinders selectively deactivated when torque demands are relatively low. However, uneven torque pulses may result when some of the cylinders are deactivated or the torque pulses at higher loads may generate undesirable noise, vibration and harshness (NVH) issues due to higher torque peaks at wider intervals. These issues may inhibit the useable dynamic range of the deactivated cylinders and reduce fuel economy. Furthermore, engines typically have predetermined optimal operating parameters at which combustion is most efficient.

SUMMARY

An engine assembly is configured with variable displacement in some cylinders, and nonvariable displacement, but optimal operating efficiency in other cylinders while still providing balanced torque pulses at the crankshaft and flywheel. Specifically, an engine assembly includes an engine block having a first bank of cylinders and a second bank of cylinders. A crankshaft is supported by the engine block and is configured to be driven by torque due to combustion energy in the first and second banks of cylinders. As used herein, a "bank" of cylinders is a row of cylinders in an engine block, with the row extending parallel to the length of the crankshaft. A first set of valves is operable to control air flow into and out of the first bank of cylinders. Camshafts are driven by the crankshaft and are operatively connected to the first set of valves to control opening and closing of the first set of valves. A second set of valves is operable to control air flow into and out of the second bank of cylinders. A controller is operatively connected to the second set of valves and is configured to vary at least one of lift, duration, and timing of the second set of valves based on commanded torque at the crankshaft to thereby vary the combustion in the second bank of cylinders. The engine block may be arranged so that the first and second banks of cylinders each have the same number of cylinders, such as in a V-6 or V-8 formation. Torque pulses acting on the crankshaft and flywheel will be symmetric if cylinders from the first and second banks are fired in alternate order.

A method of controlling an engine assembly having an engine block with a first and a second set of cylinders, a crankshaft, and camshafts driven by the crankshaft, includes opening and closing a first set of valves via the camshafts. The first set of valves controls air flow into and out of the first bank of cylinders to thereby affect drive torque provided to the crankshaft by combustion in the first set of cylinders. The method further includes varying at least one of lift, timing and duration of a second set of valves based on commanded torque at the crankshaft. The second set of valves controls airflow into and out of the second bank of cylinders to thereby affect drive torque provided to the crankshaft by combustion in the second set of cylinders.

The above features and advantages and other features and advantages of the present teachings are readily apparent from the following detailed description of the best modes for carrying out the present teachings when taken in connection with the accompanying drawings.

DETAILED DESCRIPTION

Figure 1:
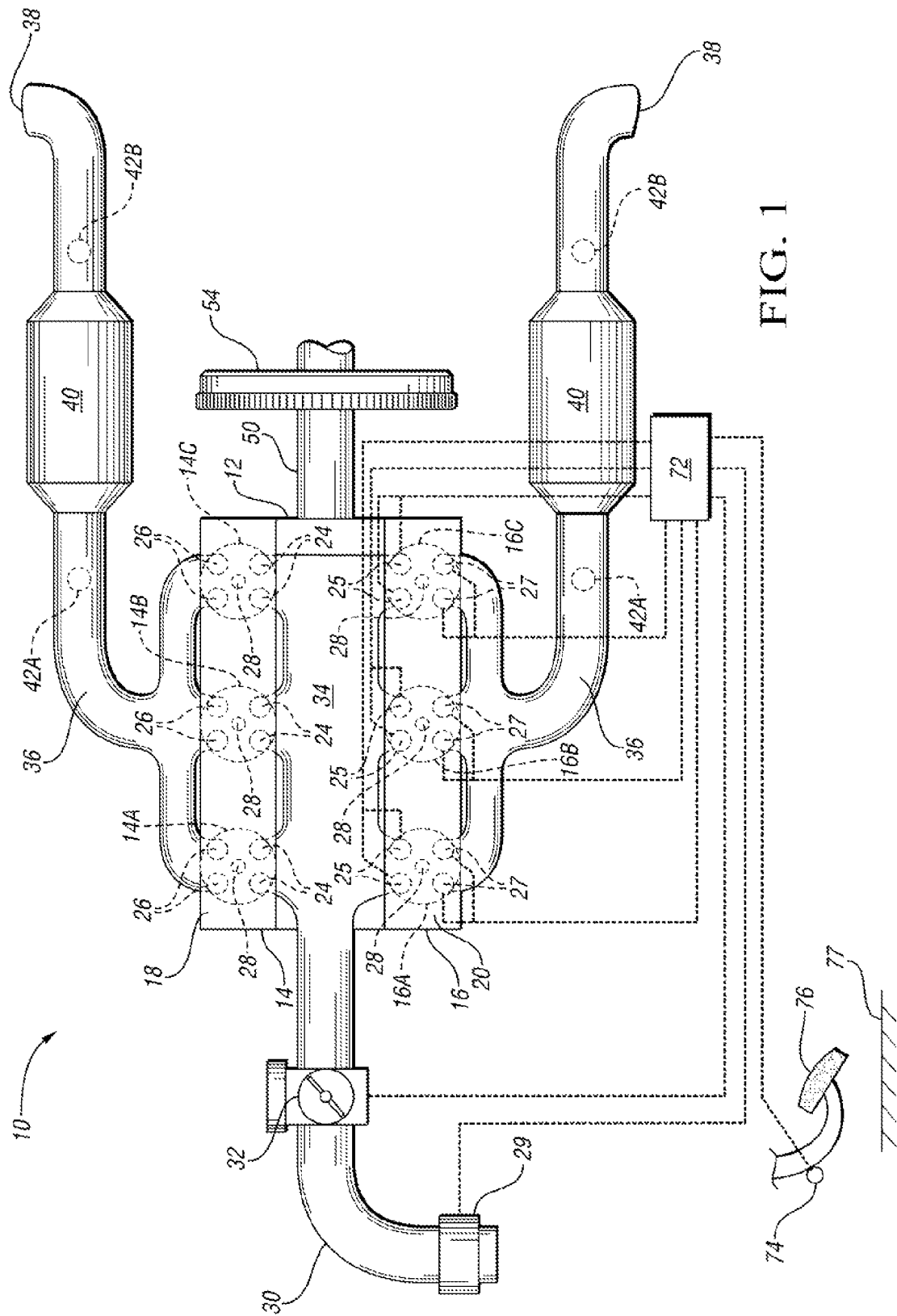
FIG. 1 is a schematic plan view of a first embodiment of an engine assembly in accordance with one aspect of the present teachings.
Figure 3:
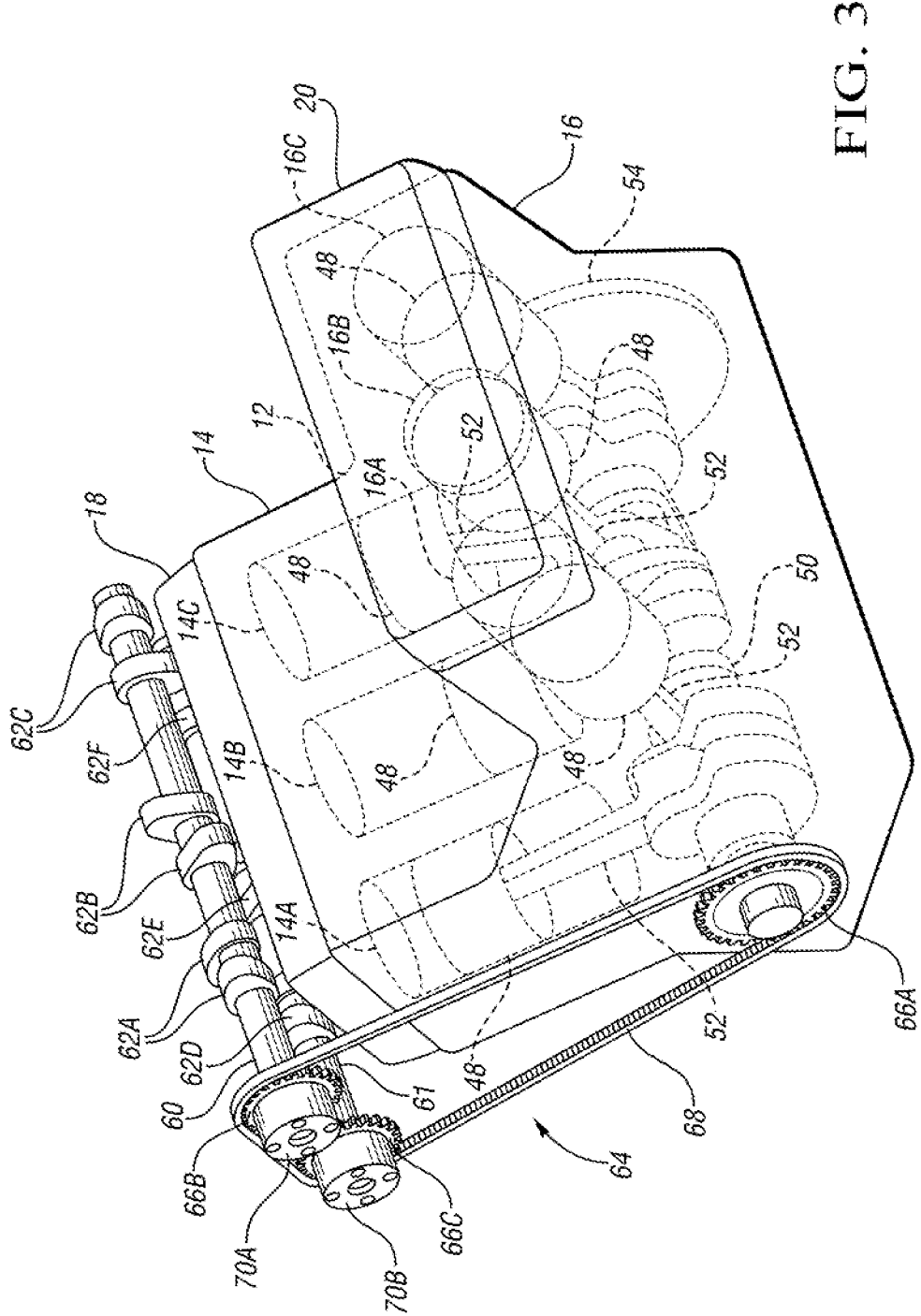
FIG. 3 is a schematic perspective view of a portion of the engine assembly of FIG. 1.

Referring to the drawings, wherein like reference numbers refer to like components, FIGS. 1 and 3 show an engine assembly 10 that has an engine block 12 configured with a first bank 14 of cylinders 14A, 14B, 14C and a second bank 16 of cylinders 16A, 16B, 16C. A first cylinder head 18 is supported by the engine block 12 over the first bank of cylinders 14. A second cylinder head 20 is supported by the engine block 12 over the second bank 16 of cylinders 16A, 16B, 16C. The cylinder head 18 supports a first set of valves, including a pair of inlet valves 24 and a pair of outlet valves 26 positioned above each of the cylinders 14A, 14B, 14C. In other embodiments, there may be only one inlet valve and one outlet valve for each cylinder 14A, 14B, 14C, 16A, 16B, 16C. A spark plug 28 is also positioned above each of the cylinders 14A, 14B, 14C. The cylinder head 20 supports a second set of valves, including a pair of inlet valves 25 and a pair of outlet valves 27 above each of the cylinders 16A, 16B, 16C. The outlet valves 26, 27 are also referred to herein as exhaust valves. A spark plug 28 is also positioned above each of the cylinders 16A, 16B, 16C.

Air is directed from an air inlet passage 30 through a single electronic throttle 32 to a common air intake manifold 34 that provides inlet air to each of the cylinders 14A, 14B, 14C, 16A, 16B, 16C as the inlet valves 24, 25 are successively selectively opened in the manner described herein. A mass air flow (MAF) sensor 29 provides parameters indicative of inlet air density to an electronic controller 72. The exhaust valves 26 are subsequently opened in the manner described herein to allow the cylinders 14A, 14B, 14C to exhaust through an exhaust passage 36 to an exhaust exit 38. The exhaust can be treated by a three-way catalyst 40, the performance of which is monitored by an upstream oxygen sensor 42A and a downstream oxygen sensor 42B which provide sensed parameters indicative of the performance of the catalyst 40 performance to the controller 72. The exhaust valves 26 of the cylinders 16A, 16B, 16C are also opened according to the manner described herein to allow cylinders 16A, 16B, 16C to exhaust through a similar exhaust passage 36 to an exhaust exit 38.

The exhaust from the cylinders 16A, 16B, 16C can be treated by another three-way catalyst 40, the performance of which is monitored by an upstream oxygen sensor 42A and a downstream oxygen sensor 42B. The sensors 42A, 42B are operatively connected to the controller 72, although connecting wires are not shown for simplicity in the drawings. Alternatively, the engine assembly 10 could be arranged so that exhaust from both banks 14, 16 of cylinders 14A, 14B, 14C, 16A, 16B, 16C can feed into a common exhaust passage.

Fuel is selectively introduced in the cylinders 14A, 14B, 14C, 16A, 16B, 16C in a timed manner with firing of the spark plugs 28 to cause pistons 48 (shown in FIG. 3) within each of the cylinders 14A, 14B, 14C 16A, 16B, 16C to turn a crankshaft 50 supported by the cylinder block 12. The pistons 48 travel up and down within the cylinders 14A, 14B, 14C, 16A, 16B, 16C and cause rotation of the crankshaft 50 via connecting piston rods 52. The crankshaft 50 supports a flywheel 54 used to help maintain momentum and drive a transmission (not shown) operatively connected to the crankshaft 50.

The engine assembly 10 is configured to balance the need to meet torque demands and operate with significant fuel efficiency and cost savings. Specifically, combustion within the cylinders 14A, 14B, and 14C of the first bank 14 is according to a fixed, predetermined engine operating efficiency. The inlet valves 24 of the first set of cylinders 14A, 14B, 14C are made to lift and lower by an overhead camshaft 60 shown in FIG. 3. Similarly, the outlet valves 26 of the first set of cylinders 14A, 14B, 14C are made to lift and lower by an exhaust camshaft 61. In FIG. 3, a camshaft cover is removed to expose the camshafts 60, 61. Furthermore, supporting bearings or mounts used to support the camshaft 60 over the cylinder head 18 are not shown for purposes of simplicity on the drawing. Such mounts could attach to the cylinder block 12 or the cylinder head 18, as will be readily understood by a person of ordinary skill in the art.

The camshafts 60, 61 have a variety of eccentric lobes 62A, 62B, 62C, 62D, 62E, 62F arranged to cause lifting and lowering of the valves 24, 26 of the cylinders 14A, 14B, 14C in a predetermined order and at a predetermined timing. The camshafts 60, 61 are driven by the crankshaft 50 through a belt drive 64 that can include a sprocket 66A mounted on the crankshaft 50, a sprocket 66B mounted on the camshaft 60, and a sprocket 66C mounted on the camshaft 61. A belt 68 connects the sprockets 66A, 66B, 66C. Belt tensioners and guides may be mounted to the engine block 12 but are not shown for purposes of simplicity in the drawing. In other embodiments, the belt drive 64 may be a gear train or a chain drive. Furthermore, two separate belts can be driven by the crankshaft 16 to drive the camshafts 60, 61 separately.

A camshaft phaser 70A can be operatively connected to the camshaft 60 and controlled by a controller 72 shown in FIG. 1 to vary the relative angular orientation of the camshaft 60 with respect to the crankshaft 50, thereby varying the timing of the opening and closing of the valves 24 with respect to the position of the respective pistons 48 within the cylinders 14A, 14B, 14C. Similarly, a camshaft phaser 70B can be operatively connected to the camshaft 61 and controller by the controller 72 to vary the relative angular orientation of the camshaft 61 with respect to the crankshaft 50, thereby varying the timing of the opening and closing of the valves 26. The phasers 70A, 70B can be hydraulic vane phasers, in which case the controller 72 ultimately controls the flow of hydraulic fluid to the phasers 70A, 70B to adjust the camshafts 60, 61. The hydraulic connection to the phasers 70A, 70B may be through passages within the engine block 12 and through the cylinder head 18 to the phaser 70A. 70B. These passages are not shown for purposes of simplicity in the drawings. A person of ordinary skill in the art would understand a variety of ways to route hydraulic fluid to the phasers 70A, 70B under the control of the controller 72. Any suitable phaser can be used.

Accordingly, combustion within the first bank 14 of cylinders 14A, 14B, 14C can be controlled to meet predetermined efficiency requirements. For example, the timing of the valves 24, 26 via the camshafts 60, 61 as well as the position of the throttle 32 can be controlled to allow combustion in the cylinders 14A, 14B, 14C so that the engine assembly 10 operates according to a predetermined combustion efficiency, such as may be indicated by a brake specific fuel consumption (BSFC) curve. Inlet air parameters measured by the MAF sensor 29 can be used by the controller 72 in determining optimal valve timing and throttle position.

Combustion within the second bank 16 of cylinders 16A, 16B, 16C, by contrast, is controlled in an "on demand" manner as needed to meet increasing load demands. Specifically, any or all of: (i) the timing of the opening of the valves 25, 27; (ii) the duration of the opening of the valves 25, 27; and (iii) the amount of lift of the valves 25, 27, including zero lift (i.e., cylinder deactivation), can be implemented by the controller 72 to add displacement as needed to meet load demands. The load demands can be determined by the controller 72 based on a position sensor 74 connected to an accelerator pedal 76 above a vehicle floor 77. The position sensor 74 is operable to send a sensor signal to the controller 72. Load demands may further be determined by the controller 72 based on other sensed engine operating conditions, such as a speed sensor or a torque sensor operatively connected to the crankshaft 50.

In one embodiment, the timing and duration of the opening of the inlet valves 25, and the amount of lift of the exhaust valves 27 are varied as needed. Control of the valve 25, 27 in this manner can be referred to as continuously variable valve displacement or continuously variable virtual displacement. Any suitable variable valve mechanism can be used to achieve the variation in timing, duration and lift. For example the controller 72 can control electrical signals to solenoid valves that controls hydraulic flow to the valves 25, 27 to vary their timing, duration and lift.

Each of the banks of cylinders 14, 16 can be configured to have the same number of cylinders. In the embodiment of FIG. 1, bank 14 has three cylinders 14A, 14B, 14C, and bank 16 has three cylinders 16A, 16B, 16C. When torque demand can be met by using only the cylinders of the first bank 14 operating according to the predetermined combustion efficiency, then the spark plugs 28 of the cylinders 14A, 14B, 14C can be energized so that the cylinders fire in the order 14A, 14B, 14C.

If the controller 72 determines that additional displacement is required to meet torque demand, then the spark plugs 28 of the cylinders 16A, 16B, 16C of the second bank 16 can also be energized, with the spark plugs 28 and the valves 25, 27 controlled in a manner such that cylinders of the first bank 14 and cylinders of the second bank 16 are fired in alternating order. That is, the cylinders are fired in the order 14A, 16A, 14B, 16B, 14C, 16C. Because the torque generated by the combustion in each cylinder 14A, 14B, 14C is substantially equal, and the torque generated by combustion in each cylinder 16A, 16B, 16C is substantially equal but likely different than the torque generated in cylinders 14A, 14B, 14C, by alternating the firing order as described, the torque pulses transmitted to the flywheel 54 will be symmetrically delivered. For example, torque pulses generated by combustion in the cylinders 14A, 14B, 14C may be substantially larger than those generated by combustion in the cylinders 16A, 16B, 16C. All of the larger torque pulses would then be delivered from the same direction and with equal spacing. In comparison, if a six cylinder engine arranged in V-formation is run in four cylinder mode, even if one cylinder from each bank is deactivated, the torque pulses are not symmetrically delivered. For example, depending on which two cylinders are deactivated, there may be two pulses delivered from one bank, with a zero torque pulse in between, followed by two pulses delivered from the other bank with a zero torque pulse in between. Alternatively, there could be two pulses from one bank, followed by two pulses from the other bank, followed by two zero torque pulses.

Figure 2:
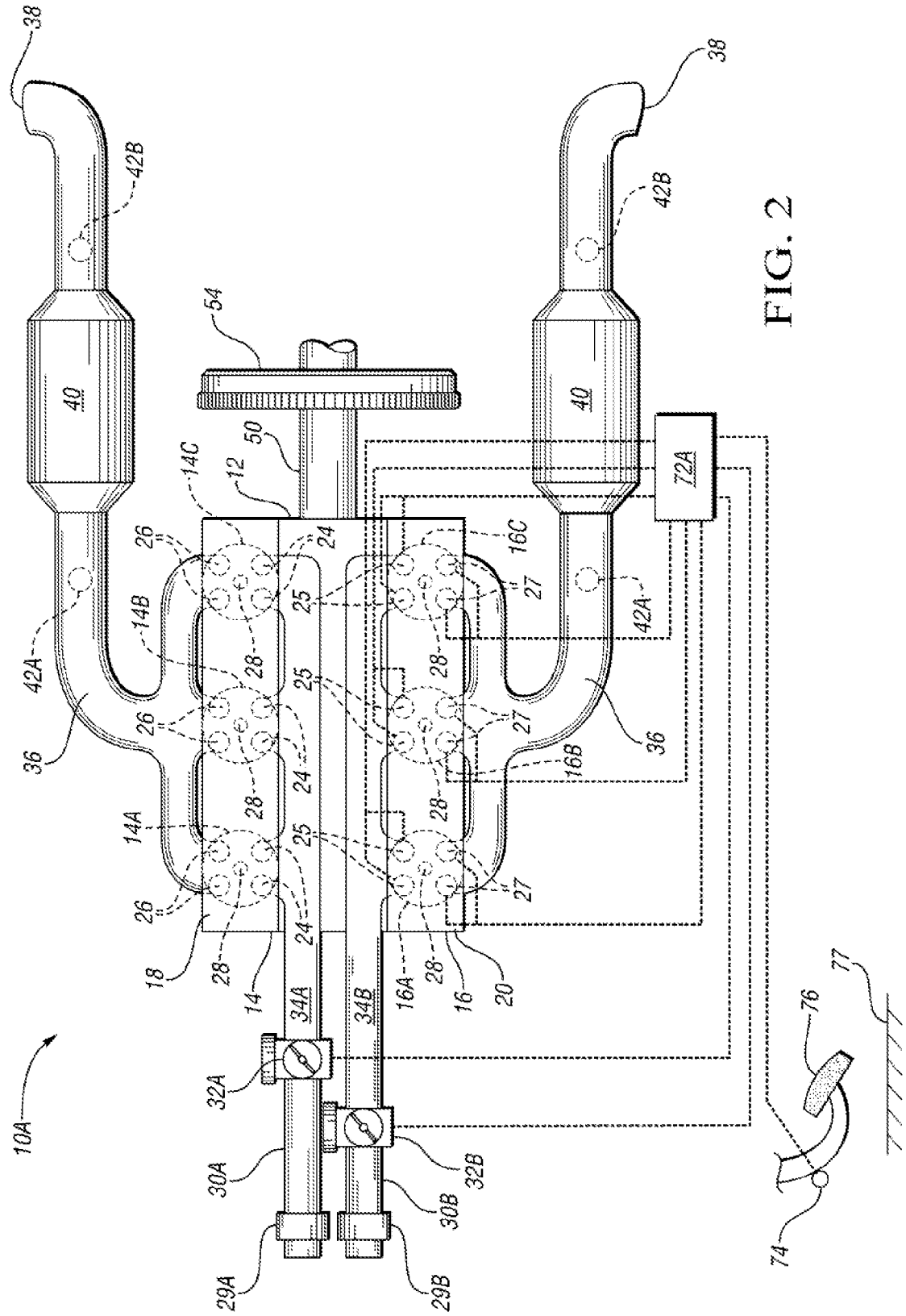
FIG. 2 is a schematic plan view of a second embodiment of an engine assembly in accordance with an alternative aspect of the present teachings.

FIG. 2 shows an engine assembly 10A having many of the same components as the engine assembly 10. Identical components are indicated with identical reference numbers. The engine assembly 10A has two separate throttles 32A, 32B controlling air flow to two separate intake manifolds 34A, 34B. Specifically, air is directed from an air inlet passage 30A through electronic throttle 32A to an air intake manifold 34A that provides inlet air to each of the cylinders 14A, 14B, 14C of the first bank 14 as the inlet valves 24 are successively selectively opened in the manner described herein. Air is directed from a separate air inlet passage 30B through electronic throttle 32B to an air intake manifold 34B that provides inlet air to each of the cylinders 16A, 16B, 16C of the second bank 16 as the inlet valves 25 are successively selectively opened in the manner described herein. Mass air flow sensors 29A, 29B operatively connected to the controller 72A are used to determine properties of the inlet air, which affects the optimal position of the throttle valve 32A and of the phasers 70A, 70B to achieve the optimal combustion efficiency in the bank 14.

The controller 72A can control each of the throttles 32A, 32B to different positions to achieve the separate functions of the two banks of cylinders 14, 16. That is, the throttle 32A can be positioned to help achieve optimal combustion efficiency in the cylinders 14A, 14B, 14C, while the throttle 32B can be controlled to achieve the varying additional torque required from cylinders 16A, 16B, 16C to meet variations in demanded torque. Other components of the engine assembly 10A are operatively connected to the controller 72A to be controlled as described with respect to the controller 72 of FIG. 1. For example, the inlet valves 24, 25, the outlet valves 26, 27, the spark plugs 28, the oxygen sensors 42A, 42B and the position sensor 74 are in operative communication with the controller 72.

Figure 4:
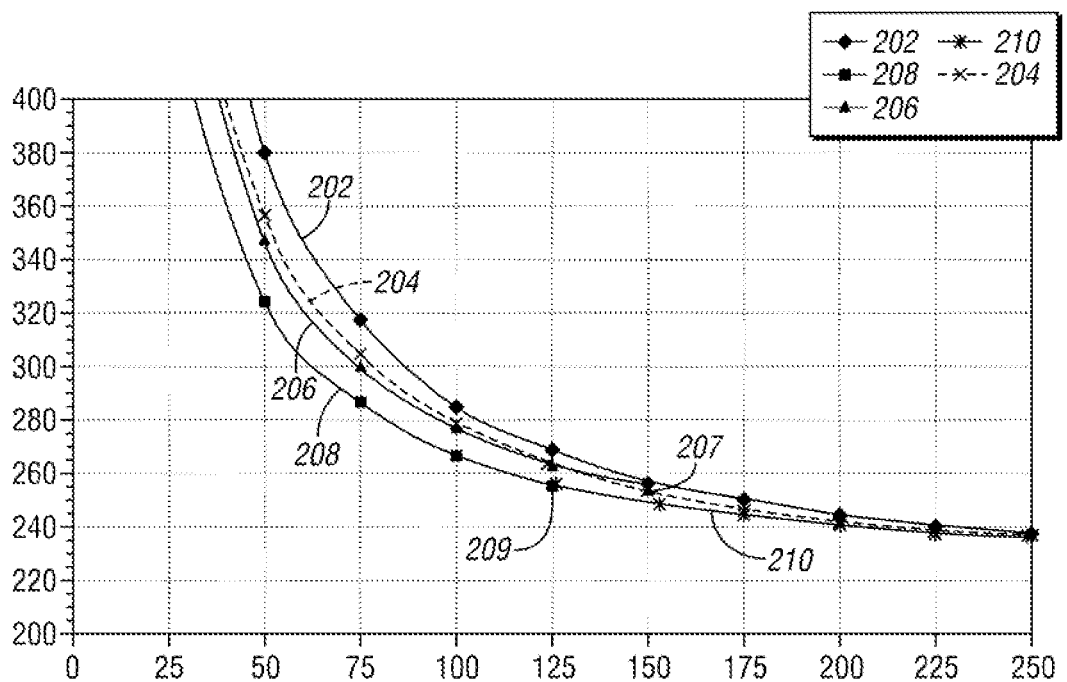
FIG. 4 is a plot of brake specific fuel consumption versus engine torque for various engines operated with deactivation or with continuously variable valve actuation of various cylinders.

FIG. 4 is a chart of brake specific fuel consumption versus engine torque for different engines controlled to operate in various different ways, such as with deactivation or with continuously variable valve actuation of selected cylinders. Specifically, curve 202 shows a theoretical brake specific fuel consumption in grams per kilowatt hour (g/kw-h) for an example engine assembly having two banks of cylinders arranged in a V-6 formation (i.e., three cylinders in each bank, similar to engine assemblies 10 and 10A). Curve 204 indicates the theoretical brake specific fuel consumption for the same engine assembly if equipped with inlet and outlet valves controllable to achieve continuously variable valve lift on all six cylinders. Curve 206 indicates the theoretical brake specific fuel consumption for the same engine assembly if equipped with the ability to deactivate two of the cylinders, to thereby be run in a four cylinder mode. Point 207 is the theoretical limit of the four cylinder mode with two cylinders deactivated. Curve 208 indicates the theoretical brake specific fuel consumption for the same engine assembly if equipped with the ability to deactivate three of the cylinders to be run in a three cylinder mode. Point 209 is the theoretical limit of the three cylinder mode with three of the cylinders deactivated. Curve 210 indicates the theoretical brake specific fuel consumption for the same engine assembly if one bank of cylinders is equipped with valves capable to achieve continuously variable valve lift. This would allow the engine assembly to be operated in the three cylinder deactivation mode along curve 208 up to the limit at point 209. The three cylinders that had been deactivated can then be controlled to operate with at least some combustion, thereby extending operation along the curve 210.

The engine assembly 10 or 10A having one bank 16 of cylinders 16A, 16B, 16C with valves controlled for continuously variable valve displacement could thus be operated along a curve similar to curve 208, extending to curve 210. The engine assembly 10, 10A would first be operated with cylinders 16A, 16B, 16C deactivated, such as by closing exhaust valves 27, and with cylinders 14A, 14B, 14C, operating to achieve the predetermined combustion efficiency, along curve 208. At the limit of three cylinder deactivation at point 209, the three cylinders 16A, 16B, 16C would then be operated along curve 210, with some combustion using the continuously variable lift, duration, or timing of the valves 25, 27, under the control of controller 72 or 72A, and with the cylinders 14A, 14B, 14C continuing to be controlled to operate according to the predetermined combustion efficiency.

Figure 5:
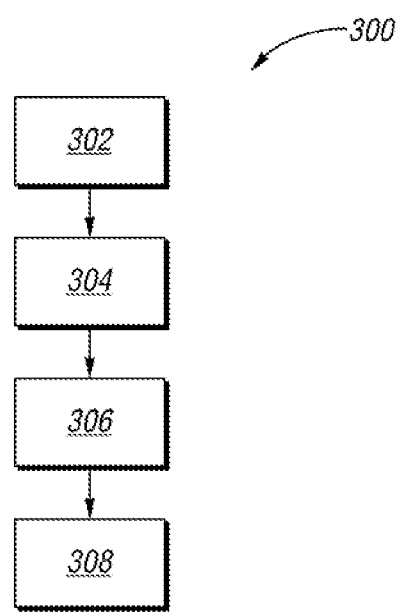
FIG. 5 is a flowchart of a method of controlling an engine assembly.

FIG. 5 is a flow diagram 300 of a method of operating an engine assembly such as engine assembly 10 or 10A, as carried out by an algorithm stored in a processor of the controller 72 or 72A. The method 300 begins with block 302, in which the controller 72 or 72A receives a torque command signal from the accelerator position sensor 74. The torque command signal indicates the amount of torque at the crankshaft 50 commanded by the vehicle operator. In block 304, the controller 72 or 72A also receives a sensor signal from a position sensor on the throttle 32 in the engine assembly 10, or from both throttles 32A and 32B in the engine assembly 10A, indicative of the position of the throttle 32 or 32A, 32B. Based at least partially on the sensor signals received in blocks 302 and 304, the controller 72 or 72A then controls the valves 25, 27 of the second set of cylinders 16A, 16B in block 306 to vary at least one of lift, timing and duration of the second set of valves 25, 27 in block 306. The controller 72 or 72A can have a look up table of stored torque and engine speed data corresponding with valve lift, timing and duration. The camshafts 60, 61 of FIG. 3 mechanically control the opening and closing of the valves 24, 26, and are configured to do so to achieve a predetermined combustion efficiency in the cylinders 14A, 14B, 14C. Under the method, in block 308, the controller 72 or 72A can also control phasers 70A, 70B such as is shown in FIG. 3 to maintain a predetermined combustion efficiency in the cylinders 14A, 14B, 14C. The controller 72 or 72A thus controls the valves 25, 27 of the second set of cylinders 16A, 16B, 16C to achieve the commanded crankshaft torque, with the second set of cylinders 16A, 16B, 16C adding a level of torque as necessary to meet commanded crankshaft torque when added to the torque delivered to the crankshaft by the first set of cylinders 14A, 14B, 14C operating according to the predetermined combustion efficiency.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. An engine assembly comprising:
an engine block having a first bank of cylinders and a second bank of cylinders;
a crankshaft supported by the engine block and configured to be driven by torque due to combustion energy in the first and second banks of cylinders;
a first set of valves operable to control air flow into and out of the first bank of cylinders;
a pair of camshafts driven by the crankshaft and operatively connected to the first set of valves to control opening and closing of the first set of valves;
a second set of valves operable to control air flow into and out of the second bank of cylinders; and
a controller operatively connected to the first set of valves and the pair of camshafts and configured to control the first set of valves and the pair of camshafts so that combustion in the first bank of cylinders is at a predetermined engine operating efficiency, and operatively connected to the second set of valves and configured to deactivate the second set of cylinders and thereafter resume combustion in the second set of cylinders by varying each of lift, duration, and timing of the second set of valves based on commanded torque at the crankshaft to thereby vary the combustion in the second bank of cylinders while combustion in the first bank of cylinders remains at the predetermined engine operating efficiency.

2. The engine assembly of claim 1, further comprising:
a single throttle through which air flow is directed to both of the first and the second sets of valves;
wherein the controller is configured to vary said each of lift, duration, and timing of the second set of valves based at least partially on a position of the throttle.

3. The engine assembly of claim 1, further comprising:
a first throttle through which air flow is directed to the first bank of cylinders;
a second throttle through which air flow is directed to the second bank of cylinders;
wherein the controller is configured to position the first throttle to provide combustion in the first bank of cylinders at the predetermined engine operating efficiency; and
wherein the controller is configured to position the second throttle to enable the combustion in the second bank of cylinders.

4. The engine assembly of claim 1, wherein the second set of valves includes inlet valves configured to be varied by lift and duration and outlet valves configured to be selectively deactivated to zero valve lift.

5. The engine assembly of claim 1, wherein the controller varies the combustion in the second bank of cylinders based at least partially on stored torque versus engine speed data.

6. The engine assembly of claim 1, further comprising:
camshaft phasers operatively connected to the camshafts and to the controller; and
wherein the controller controls the camshaft phasers to enable the combustion in the first bank of cylinders at the predetermined engine operating efficiency.

7. The engine assembly of claim 1, wherein the engine block is arranged in a V formation and each of the first and the second banks of cylinders has the same number of cylinders.

8. The engine assembly of claim 1, wherein a flywheel is positioned on the crankshaft; and wherein the first and second banks of cylinders are arranged so that the torque due to combustion energy in the cylinders driving the crankshaft is delivered symmetrically to the flywheel.

9. An engine assembly comprising:
an engine block having a first bank of cylinders and a second bank of cylinders;
a crankshaft supported by the engine block and configured to be driven by torque due to combustion energy in the first and the second banks of cylinders;
a first set of valves including inlet valves operable to control air flow into and out of the first bank of cylinders and outlet valves operable to control air flow out of the first set of valves;
a first camshaft driven by the crankshaft and operatively connected to the inlet valves of the first set of valves to control opening and closing of the inlet valves of the first set of valves;
a second camshaft driven by the crankshaft and operatively connected to the outlet valves of the first set of valves to control opening and closing of the outlet valves of the first set of valves; wherein the first set of valves and the first and the second camshaft are configured so that combustion in the first bank of cylinders is at a predetermined engine operating efficiency;
a second set of valves including inlet valves operable to control air flow into the second bank of cylinders and outlet valves operable to control air flow out of the second bank of cylinders;
a controller operatively connected to the first set of valves and the first and second camshafts and configured to control the first set of valves and the first and second camshafts so that combustion in the first bank of cylinders is at a predetermined engine operating efficiency, and operatively connected to the second set of valves and configured to selectively deactivate the outlet valves of the second bank of cylinders to zero valve lift and thereafter resume combustion in the second set of cylinders by varying the lift and duration of the inlet valves of the second bank of cylinders to thereby vary the combustion in the second bank of cylinders while combustion in the first bank of cylinders remains at the predetermined engine operating efficiency such that torque provided by combustion in the first and the second banks of cylinders satisfies a commanded torque; and
wherein the engine block is arranged in a V formation and each of the first and the second banks of cylinders has the same number of cylinders.

10. The engine assembly of claim 9, further comprising:
a single throttle through which air flow is directed to both of the first and the second sets of valves;
a single air manifold downstream of the throttle and upstream of the first and the second sets of valves; and
wherein the controller is configured to vary the lift and duration of the inlet valves of the second bank of cylinders and to selectively deactivate the outlet valves of the second bank of cylinders based at least partially on a position of the throttle.

11. The engine assembly of claim 9, further comprising:
a first throttle through which air flow is directed to the first bank of cylinders;
a second throttle through which air flow is directed to the second bank of cylinders;
wherein the controller is configured to position the first throttle to provide combustion in the first bank of cylinders at a predetermined engine operating efficiency; and
wherein the controller is configured to position the second throttle to enable combustion in the second bank of cylinders.

12. The engine assembly of claim 9, wherein the controller varies the combustion in the second bank of cylinders based at least partially on stored data relating torque and engine speed.

13. The engine assembly of claim 9, further comprising:
- a first camshaft phaser operatively connected to the first camshaft and to the controller;
- a second camshaft phaser operatively connected to the second camshaft and to the controller; and
- wherein the controller controls the camshaft phasers to enable the combustion in the first bank of cylinders at the predetermined engine operating efficiency.

14. A method of controlling an engine assembly having an engine block with a first bank of three cylinders and a second bank of three cylinders, a crankshaft, and camshafts driven by the crankshaft; wherein the camshafts are operable to open and close a first set of valves that control air flow into and out of the first bank of cylinders to thereby affect drive torque provided to the crankshaft by combustion in the first bank of cylinders; the method comprising:
- deactivating the second set of cylinders;
- controlling the camshafts so that combustion efficiency in the first bank of cylinders is at a predetermined engine operating efficiency while the second set of cylinders remain deactivated;
- when an engine torque limit of the first bank of cylinders is reached, resuming combustion in the second set of cylinders by varying each of lift, timing and duration of a second set of valves based on commanded torque at the crankshaft to provide engine torque up to a brake specific fuel consumption limit; and
- wherein the second set of valves controls airflow into and out of the second bank of cylinders to thereby affect drive torque provided to the crankshaft by combustion in the second bank of cylinders.

15. The method of claim 14, further comprising:
- receiving a sensor signal indicative of a position of a throttle; wherein the throttle directs air flow to the second set of valves; and
- wherein said varying is at least partially based on the position of the throttle.

16. The method of claim 14, further comprising:
- controlling a phaser to change a position of one of the camshafts, thereby changing the opening and closing of some of the valves of the first set of valves; and
- wherein said controlling a phaser is based on enabling combustion efficiency in the first bank of cylinders at the predetermined engine operating efficiency.

* * * * *